Nov. 30, 1965 D. F. A. MacLACHLAN 3,221,312

MAGNETIC CORE STORAGE DEVICES

Filed April 2, 1962

INVENTOR
DONALD FULTON
ALEXANDER
MACLACHLAN

By Irwin S. Thompson
ATTORNEY 3,221,312
MAGNETIC CORE STORAGE DEVICES

Donald Fulton Alexander MacLachlan, Hanworth, Middlesex, England, assignor to Columbia Broadcasting System Inc., New York, N.Y., a corporation of New York Filed Apr. 2, 1962, Ser. No. 184,113
Claims priority, application Great Britain, Apr. 7, 1961, 12,617/61
1 Claim. (Cl. 340—174)

This invention relates to magnetic information storage systems and is more particularly concerned with binary digital storage systems of multi-element or matrix form and utilising as bit-storage elements, thin films of ferrous alloy whose magnetic hysteresis characteristic is of the so-called "square loop" or "rectangular" form suitable for magnetic storage purposes by magnetization thereof in either of two alternative directions. Such films are in the form of discrete cylinders, conveniently constituted by circumferential bands around the surface of each of a plurality of small-diameter tubes which may be of insulating material, e.g. of glass or of effectively non-magnetic electrically conductive material. An example of this general form of store is described by Hoffman, Turner and Kilburn in J. Brit. IRE vol. 20, No. 1, January 1960. such known and described store comprises a plurality of parallel magnetic cylinders constituted by film-coated glass tubes. Each glass tube has at least one conductor passing axially through its bore while its outer surface is surrounded by one or more multi-turn solenoids or transmission lines which effectively form the word selection conductor in a matrix type store. In such known arrangement, the plurality of tubes associated one with each bit of a word are assembled in parallel relationship in a common plane and each word selection conductor is looped around the plurality of tubes collectively. If desired, such conductor may be in the form of a transmission line of which one conductor passes transversely of the tubes on one side of the group and the opposite conductor parallel therewith on the opposite side of the group with reversal of the conductor dispositions in between each traverse needed to provide the required total number of solenoid turns. With such known form of encircling word selection conductor or transmission line, the external magnetic field may be of relatively high intensity and may impose limitation on the maximum spacing between adjacent word selection conductors and between adjacent bit storage zones along each tube.

One object of the present invention is to provide an improved form of such a storage device in which closer spacing of the bit storage zones may be achieved, in which the external field is materially reduced in intensity and in which the driving power requirements are also reduced.

In accordance with the invention, in a magnetic information storage device comprising a plurality of effectively non-magnetic support tubes in side-by-side relation and each provided with one or more storage zones constituted by a thin ferrous alloy film disposed circumferentially around the tube, the multi-turn conductor constituting each word selection conductor is arranged to be woven over one cylinder, under the next cylinder, over the next and so on, with any return of such conductor passing under under any cylinder which it overlaid at the previous traverse and over any cylinder which it underlaid at such previous traverse.

In order that the nature of the invention may be more readily understood, two simple embodiments thereof will now be described with reference to the accompanying drawing in which.

Figure 1:
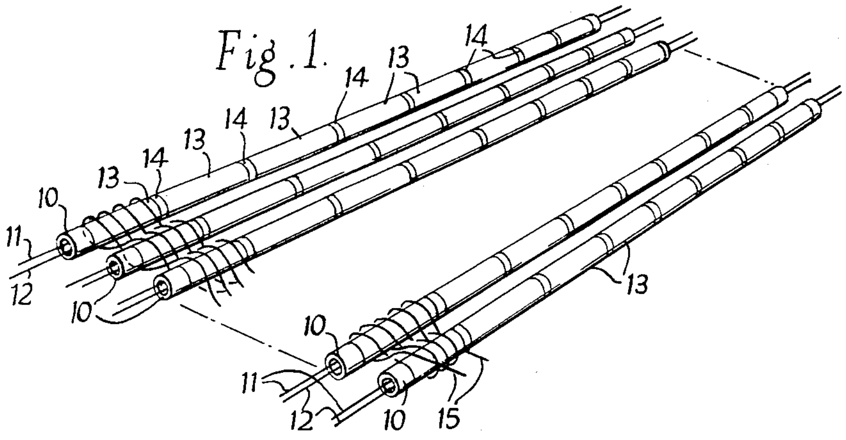
FIG. 1 is a fragmentary perspective view of a part of a magnetic information storage device embodying the invention and utilising a single woven conductor as a word selection conductor for a group of bit-storage elements.
Figure 2:
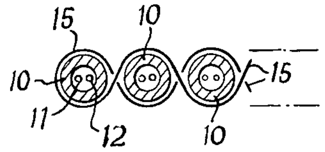
FIG. 2 is a fragmentary cross-section of the arrangement of FIG. 1.

Referring first to FIGS. 1 and 2, 10 indicates each of the storage elements supporting tubes, e.g. glass tubes, through the bore of which is disposed a pair of conductors 11 and 12 for reading and writing purposes. Around the outer surface of each tube is provided a number of separate cylindrical zones 13, of thin ferrous alloy film, e.g. a film of iron, cobalt and nickel alloy, preferably as described in my co-pending patent application Serial No. 184,189, filed April 2, 1962. The various cylindrical zones 13, which form individual bit-storage elements, are axially separated from one another along the length of each tube 10 by uncoated regions 14.

The word selection conductor associated with any particular bit-storage position on each tube 10 is, in the form shown in FIG. 1, constituted by a single conductor 15 which is woven, as seen more clearly in FIG. 2, so as to pass under one tube, over the next, under the next and so on and at the end tube to be carried therearound and then backwards so as to pass over those tubes which it passed under at the previous traverse and under those tube which it passed over at such previous traverse, and similarly, after any further reversal at the opposite end tube so as to constitute around each tube an electromagnet winding of the number of turns required.

The manner of operation of such a bit-storage arrangement may be any of those well known in the data storage or computer arts. For example, by employing the known "coincident current" method of working, a chosen one of the word selection conductors 15 and a chosen one of the writing conductors 12 may be supplied simultaneously with currents which, although individually incapable of causing change of the magnetisation direction in any bit-storage element which such conductor may pass around or through, are in combination capable of causing such change of magnetisation direction in the one bit-storage element where both of the energised conductors coincide. By suitable selection of the word selection conductor 15 and the writing conductor 12 which are supplied with current, any particular one of the plurality of storage elements may be magnetised in a direction taken as representative of the binary value "1." The opposite direction of magnetisation, obtained by reversing the polarity of the current applied to the selected conductors 12 and 15 is taken as representative of the binary value "0." In order to read out the stored digit value in any particular storage element, the particular conductors 12 and 15 which intersect at such element are supplied simultaneously with currents similar to those used for registering the binary digit value "0" in such element. If the magnetisation already present in the element is that representative of value "0," the applied currents cause practically no change in the magnetisation state and in consequence substantially no output voltage is induced in the read conductor 11 also passing through such element. If, however, the element is magnetised in the direction representing the binary digit value "1," the magnetisation direction is rapidly reversed by the applied currents in combination whereby a relatively large voltage signal is provided upon the read conductor 11.

Although the conventional "coincident-current" method of operation has been described by way of example, a storage arrangement as described may be used in any of the wide variety of other ways now well understood in the art including those of non-distinctive reading by which the magnetisation state of any storage element is not reversed from a "1" representing state to a "0" representing state during the reading operation.

Figure 3:
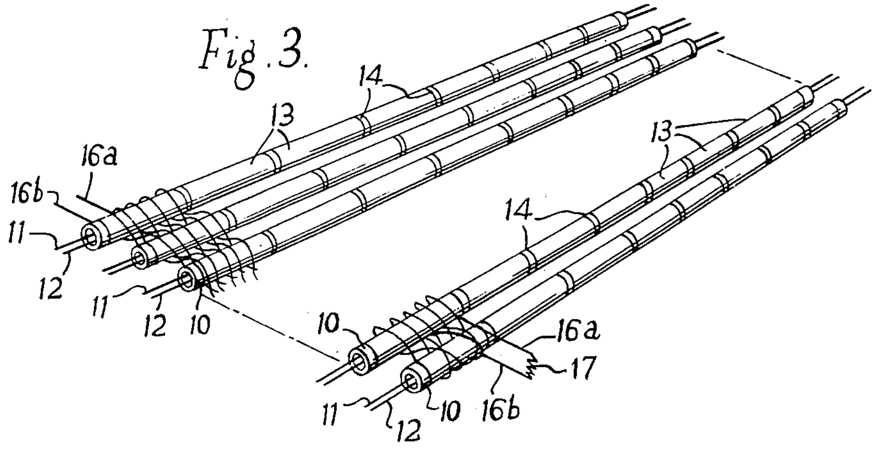
FIG. 3 is a perspective view similar to FIG. 1, but showing the slightly altered arrangements in which the transmission line form of word selection conductor is employed.
Figure 4:
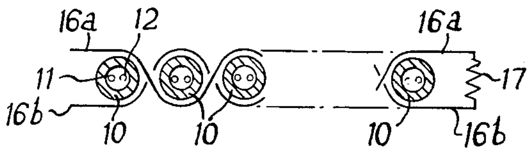
FIG. 4 is a fragmentary cross-section of the arrangement of FIG. 3.

FIGS. 3 and 4, show the slightly modified arrangement where, instead of a single conductor, a transmission line is employed as each word selection conductor. In this modification, the respective conductors 16*a*, 16*b* of the transmission line pass one over and one under the first tube 10 and then reverse so that the conductor 16*b* passes over the second tube 10 and the conductor 16*a* under such second tube and so on passing under alternate tubes and over the intervening tubes and vice versa. If, as is usual, more than one effective turn is required, around each bit-storage element 13 the respective transmisison line conductors 16*a*, 16*b* cross over at the end tube 10 and then return with opposite relationship as regards their disposition over and under each tube to that which they had at the first traverse. The same pattern is followed if more than two turns are required and the eventual two ends of the transmission line following the required number of traverses is properly terminated by a suitable value resistance as indicated at 17.

By arrangement as described above, the external field is very greatly reduced since the fields produced by adjacent conduuctor segments around adjacent bit-storage cylinders of a word storage group are opposite in direction and accordingly largely self-cancelling.

In one practical method of constructing such an improved form of storage device, the matrix as described above may be woven in a device resembling a loom, using polished wire of suitable diameter as the warp members and the word conductor or transmission line as the weft member. After weaving, the conductor system thus formed is impregnated with a suitable insulating and securing agent, e.g. with a suitable resin. The polished wire warp-forming members are then withdrawn and replaced by the magnetic cylinders consisting of film-coated tubes carrying one or more digit conductors through their respective bores.

In an alternate method of construction avoiding the use of initial substitute members for the magnetic cylinders, the latter are woven in directly as the weft-forming members and the word conductors are arranged as the warp-forming members.

It will be understood that, when the support tubes for the cylindrical storage bands are formed of electrically conductive material, such tubes may then be used as the or one of the reading/writing or equivalent conductors.

When only one such reading/writing or equivalent conductor is required and the support member employed is of electrically conductive material, such support member may clearly be of solid cross section instead of tubular. Instead of employing a number of discrete bit-storage zones 13 constituted by axially separated cylindrical regions of alloy film around each supporting tube or rod, a single alloy film zone of extended axial length may be used with the various separate conductors 15 disposed therearound at suitable spacing distances from each other along the length of the tube or rod.

I claim:

A multi-element magnetic information storage device comprising a plurality of elongated linear support tubes of non-magnetic material arranged in spaced parallel relationship, each of said tubes having around its outer surface a plurality of separate thin film layers of ferrous alloy defining a plurality of bit-storage zones in spaced relation along the length of such tube, a plurality of word-selection conductors each disposed transversely to and each embracing a different one of said storage zones on each of said tubes, each of said word-selection conductors being arranged in a woven relationship to said tubes by the disposition of a first pass thereof around a first side of the first of said tubes, then between said first tube and the second tube, then around the opposite side of said second tube, then between said second tube and the third tube, then around said first side of such third tube and so on to the last of said tubes, then completely around said last tube, then by a second pass back to the first of said tubes by disposition of such conductor around alternate sides of said tubes which are opposite to those embraced by the conductor during said first pass, then completely around said first tube to a third pass identical with said first pass and thereafter to a fourth pass identical with second path, said first, second, third and fourth passes being disposed in that order and spaced apart from each other lengthwise of the associated said bit-storage zone, and at least one electrical conductor threaded axially through each of said tubes.

References Cited by the Examiner

UNITED STATES PATENTS

| | | | |
|---|---|---|---|
| 2,792,563 | 5/1957 | Rajchman | 340—174 |
| 3,083,353 | 3/1963 | Bobeck | 340—174 |
| 3,084,336 | 4/1963 | Clemons | 340—174 |
| 3,111,652 | 11/1963 | Ford | 340—174 |

IRVING L. SRAGOW, *Primary Examiner.*